Feb. 10, 1931.  P. WEIDENFELLER  1,792,053
CARBURETOR
Filed July 25, 1927  3 Sheets-Sheet 1
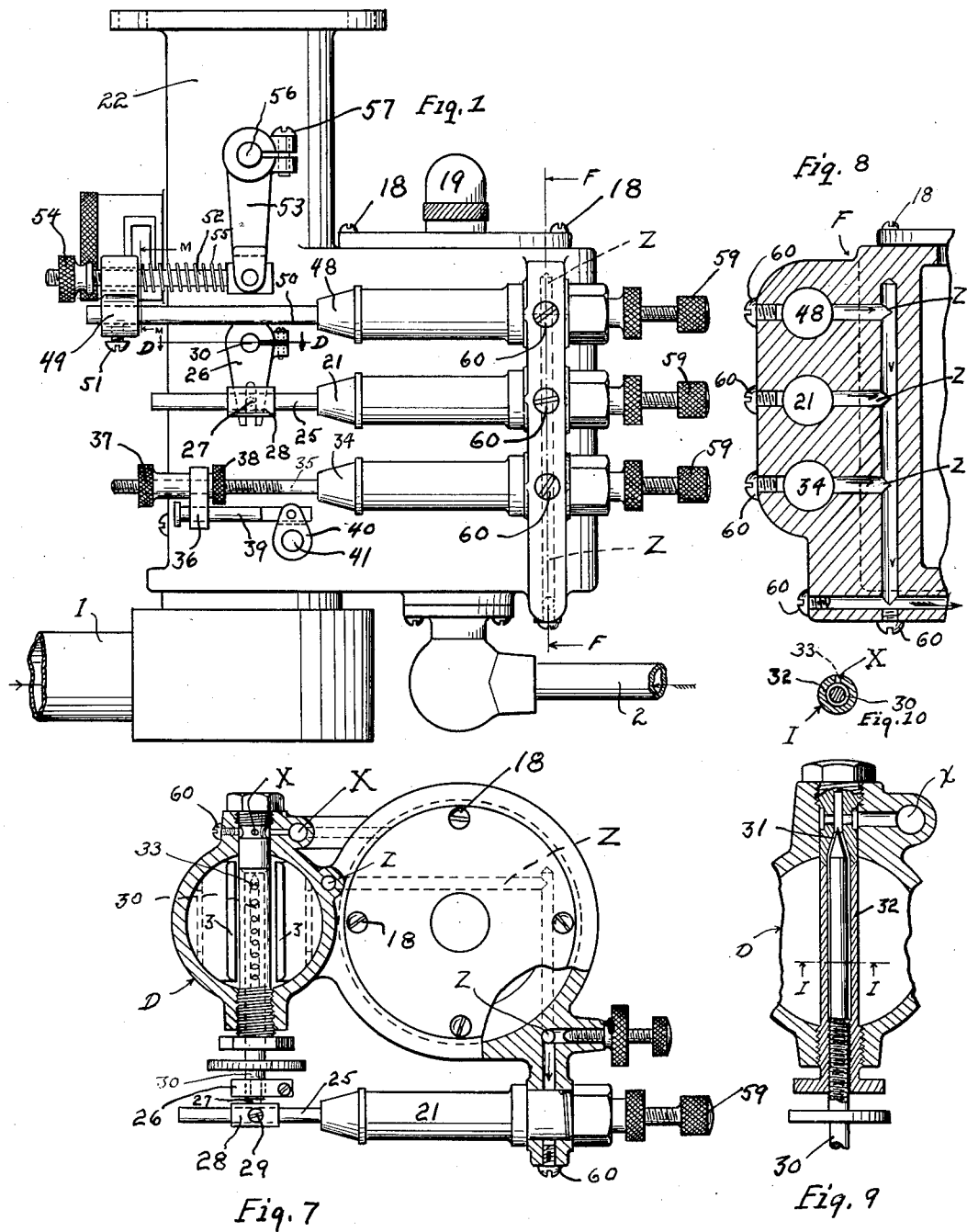
INVENTOR
Patrick Weidenfeller
BY Cyrus W. Rice
ATTORNEY

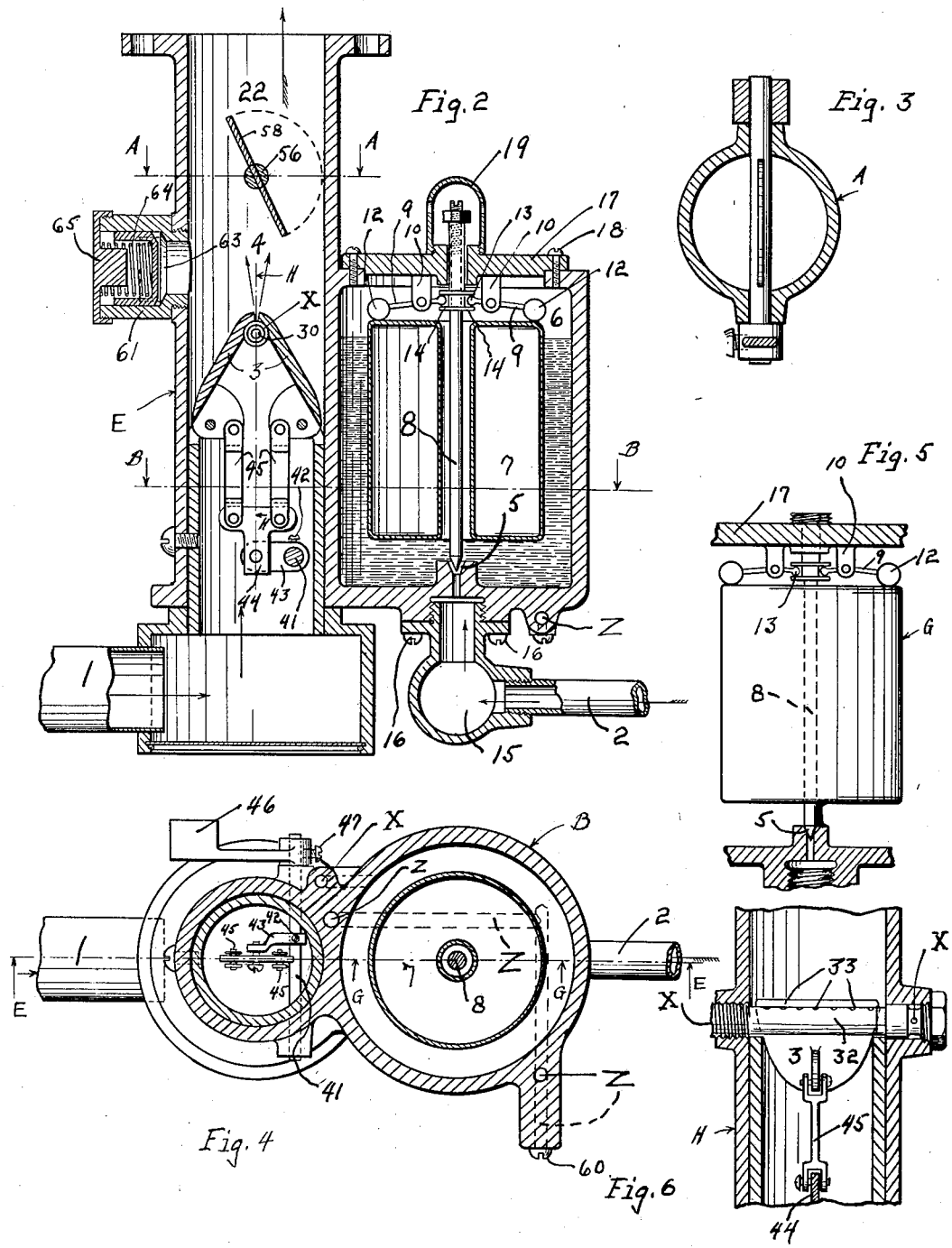

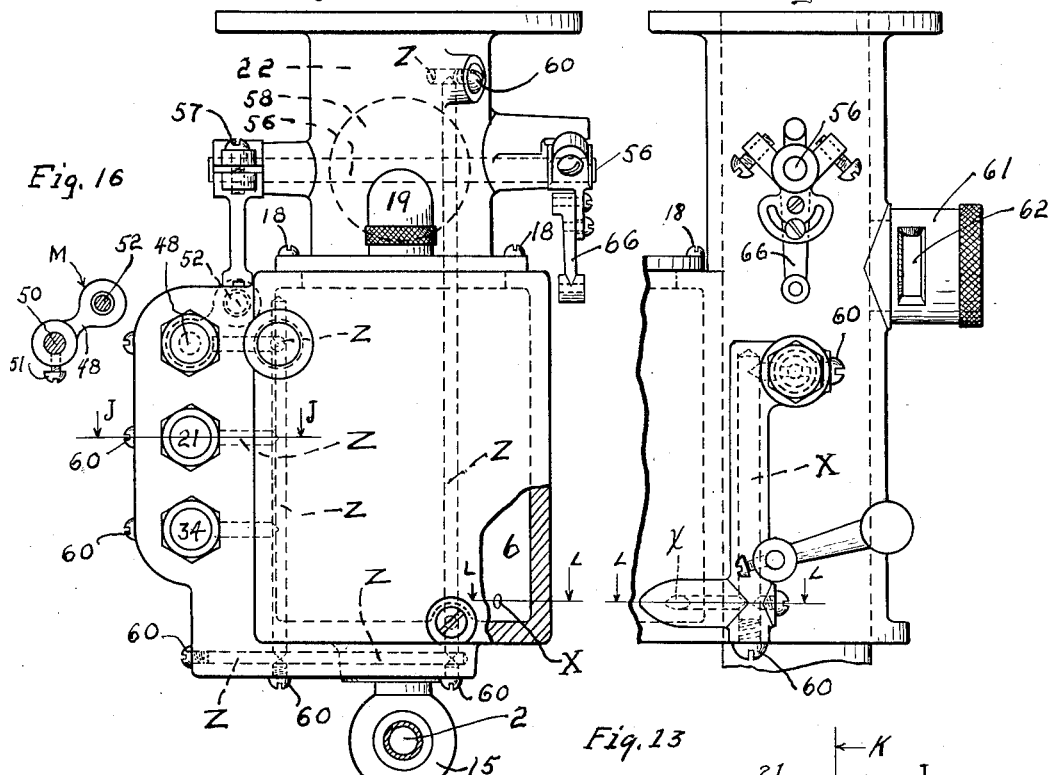

Patented Feb. 10, 1931

1,792,053

UNITED STATES PATENT OFFICE

PATRICK WEIDENFELLER, OF GRAND RAPIDS, MICHIGAN

CARBURETOR

Application filed July 25, 1297. Serial No. 208,117.

This invention relates to carburetors for internal combustion engines and more particularly to automatically load-controlled carburetors.

The main objects of this invention are to provide automatically operated means for controlling the air admitted to the mixing chamber; to provide automatically operated means for controlling the amount of gasoline admitted to the mixing chamber; to provide automatically operated means for controlling the volume flow of combustible mixture from the mixing chamber to the engine cylinders; and, to provide means, automatically operated by the load, for controlling the air and amount of gasoline admitted to the mixing chamber and the volume flow of combustible mixture therefrom, independently of the manually controlled means.

The ordinary engine of a motor car operates inefficiently and uneconomically from the standpoint of the amount of fuel consumed. It is a well-known fact that a comparatively lean mixture will keep the car in motion after momentum has once been acquired and that a richer mixture is required when the car is started or accelerated. Because of the necessity of constantly changing the speed of travel, carburetors have been designed which are adapted to take care of all conditions of travel. The engine operates at all loads but at certain loads it is desirable to have a richer combustible mixture than can be delivered. In other words, a substantially relatively constant ratio of gasoline and air is delivered to the cylinders of the engine of the ordinary car independently of the load.

Variable loads cause variable degrees of vacuum in the carburetor manifold. In the present invention, the variable degrees of vacuum are utilized for automatically controlling the air and amount of fuel admitted into the mixing chamber and for automatically controlling the volume of flow of the combustible mixture therefrom.

An illustrative embodiment of the invention is shown in the accompanying drawings, wherein:

Figure 1 is a side elevation of the carburetor.

Figure 2 is a vertical central sectional view of Figure 1 showing the interior construction;

Figure 3 is a sectional view taken on line A—A of Figure 2;

Figure 4 is a sectional view taken on line B—B of Figure 2;

Figure 5 is a fragmentary sectional view taken on line G—G of Figure 4 with the float shown in elevation and with the surrounding walls broken away;

Figure 6 is a sectional view taken on line H—H of Figure 2;

Fig. 7 is a top plan view of the carburetor with the mixing chamber shown in horizontal section taken on the line D—D of Fig. 1 and the upper vacuum control cylinder broken away;

Fig. 8 is a sectional view taken on line F—F of Figure 1;

Figure 9 is a fragmentary sectional view taken on line D—D of Figure 1;

Figure 10 is a sectional view taken on line I—I of Figure 9;

Figure 11 is an end elevation of the carburetor on the right side of Figure 1.

Figure 12 is a side elevation of the carburetor on the side opposite that shown in Figure 1;

Figure 13 is a sectional view taken on line J—J of Figure 11;

Figure 14 is a sectional view taken on line K—K of Figure 13;

Figure 15 is a sectional view taken on line L—L of Figure 12;

Figure 16 is a sectional view taken on line M—M of Figure 1; and

Figure 17 is a view of a carburetor showing a modified construction.

In the construction shown in the drawings, the carburetor is provided with the usual air intake 1 and the fuel inlet 2. The air is drawn into the carburetor in the direction of the arrows and through the gate valve 3 (best seen in Figure 2 and hereinafter described) into the mixing chamber 4.

The fuel is drawn into the carburetor in the direction of the arrows and through the needle controlled valve 5 into the float chamber 6. The fuel in the chamber 6 is maintained at a substantially constant level by the float 7, operatively connected with the needle valve 8 by means of a pair of governor arms 9 which are pivotally mounted from the depending supporting members 10.

The outer ends of the arms 9 are provided with balls 12 bearing on the top of the float and the inner ends 13 of the arms 9 are retained between the collars 14 which are secured to the upper end of the needle valve. The fuel inlet pipe 2 is screwed to the chamber 15, which is screwed to the bottom of the float chamber 6 and secured thereto by the screws 16. A cover 17 for the float chamber is secured thereto by screws 18 and is provided with an opening through which extends the head of the needle valve. A dome cap 19 covers the head of the needle valve and is screwed to the top 17.

The fuel passes from the float chamber through the pipe X and is successively shown in Figures 11, 12, 9, 7, 6 and 10. A needle valve 31 for governing the admission of fuel to the mixing chamber 4 is controlled by the needle valve control cylinder 21 which is in communication with the vacuum air pipe Z, successively shown in Figures 1, 11, 4, 7, leading to the carburetor manifold 22.

The interior construction of the cylinder 21 is best seen in Figure 13 and comprises a helical spring 23 pressing against the head of a piston 24 carried on the plunger 25. A depending crank arm 26 on the needle valve shaft 30 is connected to the plunger 25 by a pin 27. This needle valve shaft 30 is screw threaded in a left-handed direction for governing the amount of fuel admitted through the needle valve 31. A tubular fuel pipe 32 houses the needle valve 31 and is provided with a plurality of jets 33 for admitting the fuel to the mixing chamber 4. The degree of vacuum within the carburetor manifold 22 governs the position of the spring tensioned piston 24 whose reciprocal movement opens and closes the needle valve 31.

The fuel pipe 32 in conjunction with the valve members 3 forms a venturi which is self-adjusting to accommodate itself to whatever size of engine the carburetor may be used on.

Heretofore carburetors have been made with non-adjustable venturis and a different size had to be used for each different sized engine, otherwise the engine would not idle. In my construction no changes need be made for different sized engines, as the Venturi action is automatically self-adjusting to accommodate itself within reasonable limits.

The gate valve control cylinder 34 similarly communicates with the vacuum air pipe Z and the interior construction thereof is like that of the needle valve control cylinder 21 heretofore described.

The plunger 35 of the gate valve control cylinder is screw threaded and carries a depending collar 36 adjustably secured thereon by the nuts 37 and 38. The depending collar 36 is provided with an aperture through which a headed reciprocating arm 39 is adapted to slide. This reciprocating arm is pivotally connected to a crank arm 40 secured to a shaft 41. A crank arm 43 is adjustably secured on the shaft 41 by the set screw 42. The free end of the crank arm 43 is connected to a T-shaped link 44. A pair of vertically disposed links 45 are pivotally connected at one end to the opposite sides of the head of the link 44 and at their other ends this pair of links are pivotally connected to the double gate valve 3 whose opening is adjacent the jets 33 of the needle valve 20. A counterweight 46 secured to the shaft 41 by the set screw 47 tends to maintain the gate valve in a closed position. The amount of air passing to the mixing chamber variably opens and closes the double gate valve, overcoming the tendency of the counterweight to maintain the valve in a closed position. The degree of vacuum in the carburetor manifold 22 governs the position of the spring-tensioned piston within the gate valve control cylinder 34 whose reciprocal movement opens and closes the double gate valve 3.

The butterfly valve control cylinder 48 also communicates with the vacuum air pipe Z and its interior construction is like that of the other two cylinders heretofore described.

A double collar 49 is secured to the plunger 50 of the cylinder 48 by the set screw 51 and is slidable on the screw threaded shaft 52. The shaft 52 is pivotally connected with the crank arm 53 and an adjusting screw 54 governs the tension of the helical spring 55 carried thereon. This crank arm is adjustably secured to the shaft 56, which carries the butterfly valve 58, by the set screw 57. It is thus apparent that the variable degree of vacuum acting on the piston within the cylinder 48 will variably open and close the butterfly valve 58, thereby governing the volume flow of combustible mixture from the mixing chamber into the engine cylinders.

Each of the cylinders 21, 34 and 48 is provided with an adjustable screw threaded stop 59 for regulating the reciprocating movement of the several pistons 24 within their several cylinders.

The several fuel and vacuum air passages X and Z are drilled and their ends are closed by screw threaded plugs 60 to prevent leakage.

A safety valve 61 having an exhaust port 62 is secured to the wall of the carburetor adjacent the mixing chamber to protect the carburetor from damage due to disruptive pressure in case of backfire. A valve 63 is tensionally held on its seat by the helical spring 64 and a screw threaded cap 65 serves to hold the spring within the safety valve housing. The exhaust of the backfire forces the valve against its spring permitting the exhaust to escape through the port 62.

A manually operable throttle lever 66 of the usual type is connected to the shaft 56 of the butterfly valve 58 in the usual manner.

In operation, assume that the driver of the motor car has the throttle set so that the car will travel at a speed of twenty-five miles an hour. At this speed, a certain degree of vacuum is produced in the carburetor manifold. When however the load changes, due to the travel of the car up a hill, the pistons in the engine cylinders will gradually reciprocate slower and the vacuum will therefore fall. When the degree of vacuum falls, the helical springs in the cylinders 21, 34 and 48 will cause the pistons to move outwardly thereby tending to open the needle valve 31, close the double gate valve 3 and open the butterfly valve 58. Thus, when the degree of vacuum falls, the members of the gate valve 3 are drawn closer together over the jets 33 thus forming a more restricted passage, with the result that more fuel is drawn by suction through the jets thereby giving a richer mixture of fuel to the engine at a time when the engine is pulling a greater load. When the load decreases, the vacuum increases and the pistons in the cylinders 21, 34 and 48 will be drawn in against their springs by the vacuum suction from the engine manifold communicating with the several cylinders through the pipe Z.

It will therefore be seen that the variable degrees of vacuum within the carburetor manifold are made use of in automatically controlling the richness of the combustible fuel admitted from the mixing chamber to the engine cylinders.

In the modified construction shown in Figure 17, no valve controlling cylinders are used. A helical spring 80 is secured at one end to the link 70 and at its other end to the air intake pipe 1. The link 70 is pivotally connected to the crank arm 43 at one end and to the crank arm 71 at the other end. A set screw 72 secures the crank arm 71 to the needle valve shaft 30 whereby said valve is opened and closed by the rotation of its said shaft. Thus the wider the needle valve is opened, the farther the double gate valve 3, operated by the shaft 42, is closed thereby causing a greater flow of fuel from the jets 33 to provide a richer mixture for the engine cylinders.

Although several specific embodiments of the invention have been herein shown and described, it will be understood that numerous details of the constructions shown may be altered or omitted without departing from the spirit of the invention defined by the following claims.

I claim:

1. A carburetor for internal combustion engines comprising a float chamber, a mixing chamber, a fuel line providing communication between said chambers, a valve in said fuel line constituting the sole means for controlling the flow therethrough, a cylinder, a piston slidable in said cylinder, connections between said piston and valve for opening and closing said valve, a spring for normally urging said piston in a direction to open said valve, a vacuum line connecting said cylinder with the intake manifold for moving said piston in a direction to close said valve, a valve to control the flow of air to said mixing chamber and connections between said fuel and air valves for causing one of said valves to open when the other closes and vice versa.

2. A carburetor for internal combustion engines comprising a float chamber, a mixing chamber, a fuel line providing communication between said chambers, a valve in said fuel line for controlling the flow therethrough, a cylinder, a piston slidable in said cylinder, connections between said piston and valve for opening and closing said valve, a spring for normally urging said piston in a direction to open said valve, a vacuum line connecting said cylinder with the intake manifold for moving said piston in a direction to close said valve, a valve to control the flow of air to said mixing chamber, a second cylinder, a piston slidable in said second cylinder, connections between said last mentioned piston and said air valve for opening and closing said valve, a spring for normally urging said air valve piston in a direction to close said valve, and a vacuum line connecting said second cylinder with the intake manifold for moving said piston in a direction to open said air valve.

3. A carburetor for internal combustion engines comprising a float chamber, a mixing chamber, a fuel line providing communication between said chambers, said mixing chamber having an air inlet, a fuel supply nozzle in said inlet positioned for air to pass around the opposite sides thereof to cause a Venturi action, a fuel valve for said nozzle, air valves for adjusting the size of the air passageway to vary the Venturi action of said device, a vacuum line, cylinders connected with the vacuum line and having vacuum controlled pistons, means for connecting one of the pistons with the fuel valve, and means for connecting the other piston with the air valves.

4. A carburetor for internal combustion engines comprising a float chamber, a mixing chamber, a fuel line providing communication between said chambers, said mixing chamber having an air inlet, a fuel supply nozzle in said inlet positioned for air to pass around the opposite sides thereof to cause a Venturi action, a fuel valve for the nozzle, air valves for automatically adjusting the size of the air passageway to vary the Venturi action of said device, a vacuum line, cylinders connected with the vacuum line and having vacuum controlled pistons, one of the pistons being connected with the fuel valve, a rock shaft connected with and actuated by the other piston, a pair of links pivotally connected with the air valves, and an approximately T-shaped link connecting the said links with the rock shaft.

In testimony whereof I have hereunto set my hand at Grand Rapids, Michigan, this 9th day of July, 1927.

PATRICK WEIDENFELLER.